United States Patent
Xia et al.

(10) Patent No.: US 9,092,820 B2
(45) Date of Patent: Jul. 28, 2015

(54) METHOD FOR INTERCHANGING DATA BETWEEN THE THREE-DEMENSIONAL SHOPPING PLATFORM AND THE EXTERNAL PLATFORM

(71) Applicant: SPREADTRUM COMMUNICATIONS (SHANGHAI) CO., LTD., Pudongxinqu, Shanghai (CN)

(72) Inventors: Lu Xia, Shanghai (CN); Hengzhuang Jin, Shanghai (CN); Haipeng Liu, Shanghai (CN)

(73) Assignee: SPREADTRUM COMMUNICATIONS (SHANGHAI) CO., LTD. (CN)

( * ) Notice: Subject to any disclaimer, the term of this patent is extended or adjusted under 35 U.S.C. 154(b) by 14 days.

(21) Appl. No.: 14/234,568

(22) PCT Filed: Dec. 16, 2013

(86) PCT No.: PCT/CN2013/089531
§ 371 (c)(1),
(2) Date: Jan. 23, 2014

(87) PCT Pub. No.: WO2014/201824
PCT Pub. Date: Dec. 24, 2014

(65) Prior Publication Data
US 2015/0142617 A1    May 21, 2015

(30) Foreign Application Priority Data
Jun. 17, 2013  (CN) .......................... 2013 1 0240038

(51) Int. Cl.
*G06Q 30/00*   (2012.01)
*G06Q 30/06*   (2012.01)
*G06T 19/20*   (2011.01)

(52) U.S. Cl.
CPC .......... *G06Q 30/0643* (2013.01); *G06T 19/20* (2013.01); *G06T 2200/16* (2013.01); *G06T 2200/24* (2013.01); *G06T 2219/2008* (2013.01); *G06T 2219/2024* (2013.01)

(58) Field of Classification Search
USPC ...................................................... 705/26.1
See application file for complete search history.

(56) References Cited

FOREIGN PATENT DOCUMENTS

| CN | 101739633 A | 6/2010 |
|---|---|---|
| CN | 103049854 A | 4/2013 |
| WO | 2006126205 A2 | 11/2006 |

OTHER PUBLICATIONS

International Search Report and Written Opinion of the International Searching Authority Application No. PCT/CN2013/089531 Completed: Mar. 14, 2014; Mailing Date: Mar. 27, 2014 9 pages.

*Primary Examiner* — Mila Airapetian
(74) *Attorney, Agent, or Firm* — St. Onge Steward Johnston & Reens LLC

(57) ABSTRACT

The present invention discloses a method for interchanging date between the 3D shopping platform and the external platform is disclosed. The advantageous effects of this invention are but not limited to, 3D models are adopted to present the street blocks which arranges kinds of stores in mobile terminal, which is easy for user to choose store and buy goods due to intuitive vision and easy operation. Meanwhile, it enriches the function of the online shopping platform and accomplishes a closer information exchange with external platform so as to assist to prompt the shopping experience of the consumers.

10 Claims, 3 Drawing Sheets

METHOD FOR INTERCHANGING DATA BETWEEN THE THREE-DEMENSIONAL SHOPPING PLATFORM AND THE EXTERNAL PLATFORM

FIELD OF THE INVENTION

The present invention relates to technical field of electronic commerce, more specifically, to a shopping platform.

BACKGROUND OF THE INVENTION

With the popularity of online shopping, more and more online shopping platforms are presented to the consumers. However, most of the webpage representations adopted by online shopping platforms are based on planar, which differs from the physical shopping experience. For example, the key step of the presentation mode presented in online shopping platform generally is searching by user, displaying the listing and displaying the detailed information. What displayed could be the commercial draft for the goods to sell, or the text messages for the goods to sell. However, depending on the above mentioned photo and text, it is difficult to provide an overall understanding for the appearance and pattern of the whole goods, and it also increases the risk of buying defectives. The said defects can be improved by the method of three-dimensional imaging which displays every surface of the object providing the user with a comprehensive visual experience and a complete understanding of the good for sale.

Meanwhile, the function of the existing online shopping platform is limited, which can not accomplish the effective data exchange and reduces the satisfaction of the shopping experience.

SUMMARY OF THE INVENTION

Due to the defects existing in the prior art, a method for interchanging date between the 3D shopping platform and the external platform is disclosed, comprising: displaying the 3D shopping platform on the mobile terminal by a 3D shopping platform display system, wherein the 3D shopping platform comprises a 3D model, a display module which defines an image display area with a preconfigured size and constitutes display interface of the 3D shopping platform; and a storage module which presets the model unit of the 3D shopping platform and the basic data for assembling the 3D model;
assembling the 3D shopping platform display system into different 3D models based on the basic data and the model unit;
presenting street blocks in the 3D shopping platform display system by the 3D mode, where the model unit is used for presenting stores in the 3D shopping platform display system;
presenting the goods in the 3D shopping platform display system by the second 3D model where the model unit also comprises display area which is used for displaying information and/or a plurality of second 3D models;
providing a plurality of interface units with the 3D shopping platform, which are connected with the external platform wherein, the 3D shopping platform shares its user data to external platform via the interface unit, where the user data including but not limited to the activity track of user, behaviors, the consumed shopping store or the commodity information, and simultaneously, adding the user data to the basic data;
adding the recommended information alternatively, which is transmitted by the external platform to the basic data by the 3D shopping platform; and
rearranging the basic data and the model unit into different 3D models.

Preferably, the method further comprises setting a server which is provided with the interface unit, where the 3D shopping platform sends the user data to the server and the external platform obtains the user data by the interface unit.

Preferably, the method further comprises generating relevant recommended information in accordance with the record in the user data or the inquiry instruction of user in the mobile terminal by the external platform; and adding the recommended information to the basic data by the interface unit, where the 3D shopping platform display system constitutes the 3D model which is used for displaying the recommended information in accordance with the basic data and the model unit.

Preferably, the method further comprises that the external platform comprises a streetscape map module where the 3D shopping platform is connected to the streetscape map module via the interface unit, and the streetscape map module provides the streetscape information which is nearby the target location within the scope of a preconfigured distance and adds the streetscape information to the basic data via the interface unit, and the 3D shopping platform display system constitutes the 3D model used for displaying the streetscape information in accordance with the basic data and the model unit.

Preferably, the method further comprises that the 3D model units are arranged in accordance with a preconfigured condition.

Preferably, the method further comprises arranging of the 3D model units in a way of being extended from the close to the far or from the center to the periphery.

Preferably, the method further comprises that the external platform comprises an information publishing platform, a BBS platform or a social network website platform, the external platform also correlates the recommended information which is published by the user's friends, and adding the recommended information to the basic data; the 3D shopping platform display system constitutes the 3D model which is used for displaying recommended information in accordance with the basic data and the model unit.

Preferably, the method further comprises that the interface unit comprises a payment interface unit, the user terminal of 3D shopping platform is provided with a payment initiator, the payment initiator is connected to a payment system via the payment interface unit; when the user sends the payment request to the payment system via the payment interface unit, the payment system verifies the payment request and processes the verified payment request.

Preferably, the method further comprises that the payment initiator is provided with a biological feature identification device, the biological feature of the mobile terminal user is obtained by the biological feature via the biological feature identification device and the biological feature is stored into the user data, the mobile terminal identifies of the matching rate between the obtained biological features and the content stored in the storage unit, and determines that whether the payment request is safe enough or not and processes the safe payment request.

Preferably, the method further comprises acquiring the facial images or fingerprint images by adopting the mobile terminal camera or the mobile terminal touch screen by the biological feature identification device.

The advantageous effects of the above technical solution are as but not limited to: the present invention adopts 3D models to present the street blocks which arranges kinds of stores in the mobile terminal, which is easy for user to choose store and buy goods due to intuitive vision and easy operation. Meanwhile, it enriches the function of the online shopping platform and accomplishes a closer information exchange with external platform so as to assist to prompt the shopping experience of the consumers.

DETAILED DESCRIPTION OF THE INVENTION

The present invention will be further illustrated in combination with the following Figures and embodiments, However it should not be deemed as limitation of the present invention.

Figure 1:
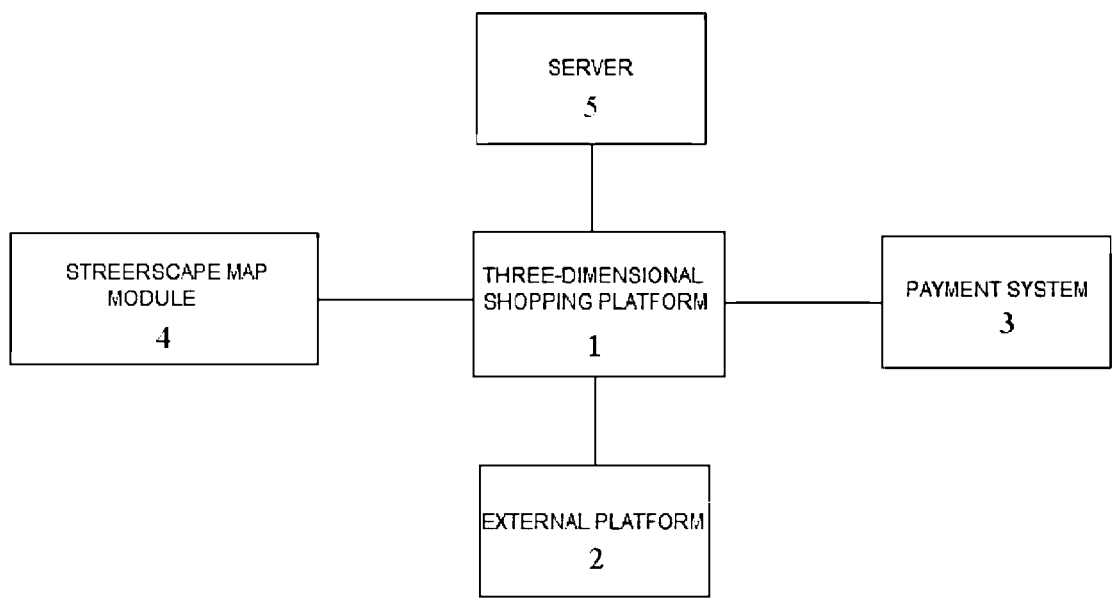
FIG. 1 is a schematic diagram illustrating connection of function modules of the present invention.
Figure 2:
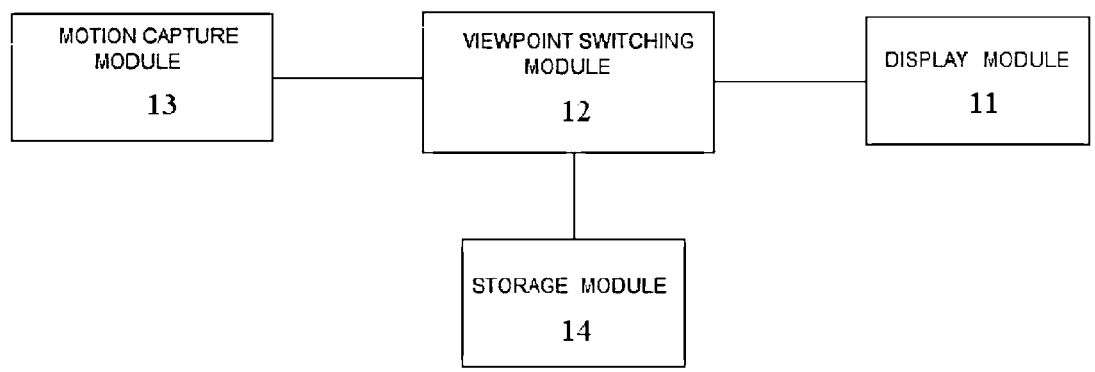
FIG. 2 is a schematic diagram illustrating the structure of the 3D shopping platform display system of the present invention.

In the embodiment of the present invention, As referred in FIGS. 1 and 2, the present invention provides a data exchange method between the 3D shopping platform and the external platform. The 3D shopping platform is displayed on mobile terminal by a 3D shopping platform display system. The 3D shopping platform defines a 3D model. And the 3D shopping platform display system also comprises, a Display Module 11 which defines an image display area with a preconfigured size. An XOY-axis is defined in the above mentioned 3D model. And the image display area is provided with a coordinate position relative to the 3D model. The coordinate position can be used for determining the position that the image display area relative to the 3D model, such as the distance and the angle relative to the 3D model.

A Perspective Switching Module 12 is connected to a Display Module 11, which is for adjusting 3D model in accordance with the position of the image display area of Display Module 11 relative to the 3D model, and for displaying the image data on the image display area, where the image data is one part of the projection for the 3D model relative to the plane.

A Motion Capture Module 13 is connected to Perspective Switching Module 12, which changes coordinate value of the image display area relative to 3D model by capturing the user behaviors and determines the position, based on the distance, the angle and so on, of the image display area relative to the 3D model in accordance with the coordinate value. Motion Capture Module 13 sends the relevant control construction to Perspective Switching module 12 in accordance with the above relative position. Perspective Switching Module 12 takes the relevant image data and displays it on the image display area according to the control construction for the user's checking.

In the embodiment of this present invention, when assembling the 3D model, it needs add a Storage module 14, Storage Module 14 saves the model unit for assembling the 3D model, i.e., a fundamental and original 3D model having with no additional substances, and the basic data which is used for assembling the model unit into different 3D models. The basic data comprises the position data for the different model unit which located on different model units. Storage Module 14 is connected to the perspective switching module.

Figure 3:
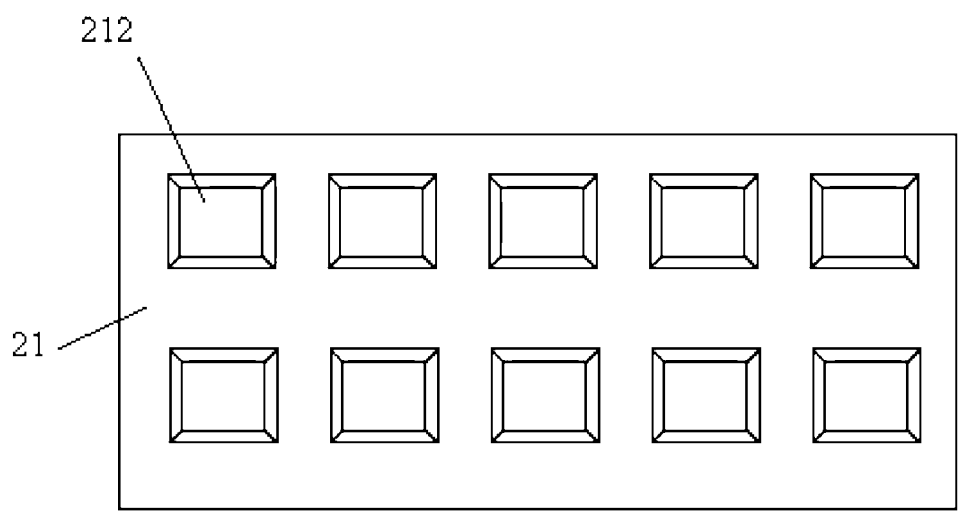
FIG. 3 is a top view of one permutation and combination for model unit in 3D model of the present invention.

As shown in FIG. 3, 3D Model 21 is used for indicating street blocks in the shopping platform display system. A Model Unit 212 is used for indicating stores in the shopping platform display system. Model Unit 212 also comprises a display area which is used for displaying information and a plurality of second 3D models. The display model adjusts along with the 3D model. The second 3D model is used for presenting the goods in the 3D shopping platform display system.

3D Shopping Platform 1 is provided with a plurality of interface units connected with External Platform 2. 3D Shopping Platform 1 shares its user data to External Platform 2 via the interface unit. The user data comprises but not limited to the activity track of user, behaviors, the consumed shopping store or the commodity information. Simultaneously, the user data is added into the basic data, or 3D Shopping Platform 1 adds the recommended information transmitted by External Platform 2 into the basic data. The basic data and the model unit are assembled into different 3D model.

The 3D model of this technical solution represents a virtual street block, and the virtual shop is represented by each model unit located in the 3D model. A plurality of the display areas for displaying the corresponding information and the second 3D module are set on each individual model unit. Each second 3D model represents a virtual goods. A 3D shopping platform comprises a plurality of virtual street blocks which is formed by the 3D model. And each street block is orderly provided with the different rows of virtual shop. Each virtual shop is orderly provided with the different rows of virtual goods, such as the second 3D model. the exterior wall decoration of each virtual shop including the follow contents, i.e., the virtual shop name, the advertisement, and different tips, such as discount information, new goods arrival information and so on. The above contents are displayed on the display area which is used for displaying the corresponding information.

The above technical solution adopts 3D models to present the street blocks which arranges different kinds of stores in the mobile terminal, which is easy for user to choose store and buy goods with the intuitive vision experience and with the easy operation. Meanwhile it enriches the function of online shopping platform and share the information like the activity track of user, behaviors, the consumed shopping store or the goods with the external platform. It also receives the recommended information from the external platform. The 3D model of recommended information presented in External Platform 2 of the mobile terminal of the 3D shopping platform, which can accomplish a closer information exchange with external platform and assist to improving the shopping experience.

The present invention further comprises a Server 5 which is provided with the interface unit. 3D Shopping Platform 1 sends the user data to Server 5. The user data is obtained by External Platform 2 through the interface unit. External Platform 2 generates the relevant recommended information in accordance with the record in the user data, alternatively, External Platform 2 generates the relevant recommended information in accordance with the user inquiry instruction in the mobile terminal and adds the recommended information into the basic data through the interface unit. The 3D shopping platform display system constitutes the 3D model used for displaying the recommended information in accordance with the basic data and with the model unit. External Platform 2 is communicated with the server via the interface unit.

The above recommended information may be actively sent by External Platform 2 in accordance with the user data record or with the user inquiry. Meanwhile, the recommendation model is displayed in a way of 3D model, which is more intuitive and enables that the user can easily and conveniently find the required store or the commodity information.

3D Shopping Platform 1 is connected to a Streetscape Map Module 4 via the interface unit. Streetscape Map Module 4 provides the streetscape information within the scope of a preconfigured distance from the target location, and adds the streetscape information to the basic data via the interface unit. The 3D shopping platform display system constitutes the 3D module which is used for displaying the streetscape information in accordance with the basic data and with the model unit.

The user sets a target on the map, then Streetscape Map Module 4 provides the streetscape information within the scope of a preconfigured distance from the target location, and adds the streetscape information to the basic data, which constitutes the 3D model used for displaying the streetscape information. Consequently, the user can find the nearby shop or commodity information more easily and quickly. It is available for Streetscape Map Module 4 to adopt the map system or navigation system provided by the third party.

3D model units are arranged in accordance with a preconfigured condition. The preconfigured condition including the following contents, i.e., the related user inquiry, the distance from the target location, credit rating, recommended rating decided by the close friend of user's and so on. The arrangement of the above contents is presented from the close to the far or from the center to the periphery. It aims to place the 3D model unit of highly recommended shop on prominent location in the 3D model.

For instance, the model unit in the 3D model is displayed in the image area in accordance with the credit rating. The model unit is displayed with recommended information. For example, the 3D model unit of highly recommended shop is placed on prominent location in the 3D model, such as the center of the mage display area. While the model unit of the shop with lower credit rating will be placed away from the center of the image display area, which differs from the model unit in the image display area Hence, it is easy for user to choose.

The above External Platform 2 refers to an information publishing platform or a BBS platform or a social network platform, such as MICROBLOG, WECHAT and the other social network platform. External Platform 2 correlates the recommended information which is published by the user's friends, and adds it to the basic data. The 3D shopping platform display system constitutes the 3D model which is used for displaying recommended information in accordance with the basic data and the model unit.

3D Shopping Platform 1 is connected to Payment System 3, which aims to get a easy payment way in shopping. The interface unit comprises a payment interface unit. The user terminal of 3D Shopping Platform 1 is provided with a payment initiator which is connected to a Payment System 3 via the payment interface unit. Payment System 3 verifies the payment request and processes the verified payment request when the user sends the request thereto via the payment interface unit. The payment initiator owns a password identification device. Preferably, the password identification device is provided with a biological feature identification device. The identification and authentication process of the biological identification technology is based on the physiological or behavior features of human beings, which resulting in low forgery. Therefore, the biological feature identification device can guarantee the payment safety.

The payment initiator obtains the biological feature of the mobile terminal user via the biological feature identification device and stores the biological feature into the user data. The mobile terminal identifies of the matching rate between the obtained biological features and the content stored in the storage unit. And it determines that whether the payment request is safe and processes the safe payment request. The biological feature identification device acquires facial image by adopting the mobile terminal camera or the biological feature identification device acquires fingerprint image by adopting the mobile terminal touch screen. Before the consumer uses the mobile terminal of 3D Shopping Platform 1 to send the request to the payment initiator, he can search the cooperation discount information of the shops and the banks in Payment System 3 via the interface unit so as to choose a proper payment way. Payment System 3 can enable the cooperation discount information of the shops and the other special offers to display on the model unit of the 3D model.

3D model in the present invention is a virtual 3D model but not the physically existed.

Although a typical embodiment of a particular structure of the specific implementation way has been given with the above description and the figures, it is appreciated that other changes based on the spirit of this invention may also be made. Though the preferred embodiments are proposed above, these contents will never be the limitation of this invention.

It is obvious for the skilled in the art to make varieties of changes and modifications after reading the above descriptions. Hence, the Claims attached should be regarded as all the changes and modifications which cover the real intention and the range of this invention. Any and all equivalent contents and ranges in the range of the Claims should be regarded belonging to the intention and the range of this invention.

What is claimed is:

1. A method of interchanging data between 3D shopping platform and external platform, wherein it comprises: displaying the 3D shopping platform on the mobile terminal by a 3D shopping platform display system, wherein the 3D shopping platform comprises a 3D model, a display module which defines an image display area with a preconfigured size and constitutes display interface of the 3D shopping platform; and a storage module which presets the model unit of the 3D shopping platform and the basic data for assembling the 3D model;

assembling the 3D shopping platform display system into different 3D models based on the basic data and the model unit;

presenting street blocks in the 3D shopping platform display system by the 3D mode, where the model unit is used for presenting stores in the 3D shopping platform display system;

presenting the goods in the 3D shopping platform display system by the second 3D model where the model unit also comprises display area which is used for displaying information and/or a plurality of second 3D models;

providing a plurality of interface units with the 3D shopping platform, which are connected with the external platform wherein, the 3D shopping platform shares its user data to external platform via the interface unit, where the user data including but not limited to the activity track of users, behaviors, the consumed shopping store or the goods information, and simultaneously, adding the user data to the basic data;

adding the recommended information alternatively, which is transmitted by the external platform to the basic data by the 3D shopping platform; and rearranging the basic data and the model unit into different 3D models.

2. A method as disclosed in claim 1, wherein it further comprises setting a server which is provided with the interface unit, where the 3D shopping platform sends the user data to the server and the external platform obtains the user data by the interface unit.

3. A method as disclosed in claim 2, wherein it further comprises generating relevant recommended information in accordance with the record in the user data or the inquiry instruction of users in mobile terminal by the external platform; and adding the recommended information to the basic data by the interface unit, where the 3D shopping platform display system constitutes the 3D model which is used for displaying the recommended information in accordance with the basic data and the model unit.

4. A method as disclosed in claim 2, wherein it further comprises that the external platform comprises a streetscape map module where the 3D shopping platform is connected to the streetscape map module via the interface unit, and the streetscape map module provides the streetscape information which is nearby the target location within the scope of a preconfigured distance and adds the streetscape information to the basic data via the interface unit, and the 3D shopping platform display system constitutes the 3D model used for displaying the streetscape information in accordance with the basic data and the model unit.

5. A method as disclosed in claim 1, wherein it further comprises that the 3D model units are arranged in accordance with a preconfigured condition.

6. A method as disclosed in claim 5, wherein it further comprises arranging of the 3D model units in a way of being extended from the close to the far or from the center to the periphery.

7. A method as disclosed in claim 3, wherein it further comprises that the external platform comprises an information publishing platform, a BBS platform or a social network website platform, the external platform also correlates the recommended information which is published by the user's friends, and adding the recommended information to the basic data; the 3D shopping platform display system constitutes the 3D model which is used for displaying recommended information in accordance with the basic data and the model unit.

8. A method as disclosed in claim 1, wherein it further comprises the interface unit comprises a payment interface unit, the user terminal of 3D shopping platform is provided with a payment initiator, the payment initiator is connected to a payment system via the payment interface unit; when the user sends the payment request to the payment system via the payment interface unit, the payment system verifies the payment request and processes the verified payment request.

9. A method as disclosed in claim 8, wherein it further comprises that the payment initiator is provided with a biological feature identification device, the biological feature of the mobile terminal user is obtained by the biological feature via the biological feature identification device and the biological feature is stored into the user data, the mobile terminal identifies of the matching rate between the obtained biological features and the content stored in the storage unit, and determines that whether the payment request is safe enough or not and processes the safe payment request.

10. A method as disclosed in claim 9, wherein it further comprises acquiring the facial images or fingerprint images by adopting the mobile terminal camera or the mobile terminal touch screen by the biological feature identification device.

* * * * *